Feb. 10, 1931.  A. W. SEYFRIED  1,792,044
TERMINAL BLOCK
Filed June 19, 1929
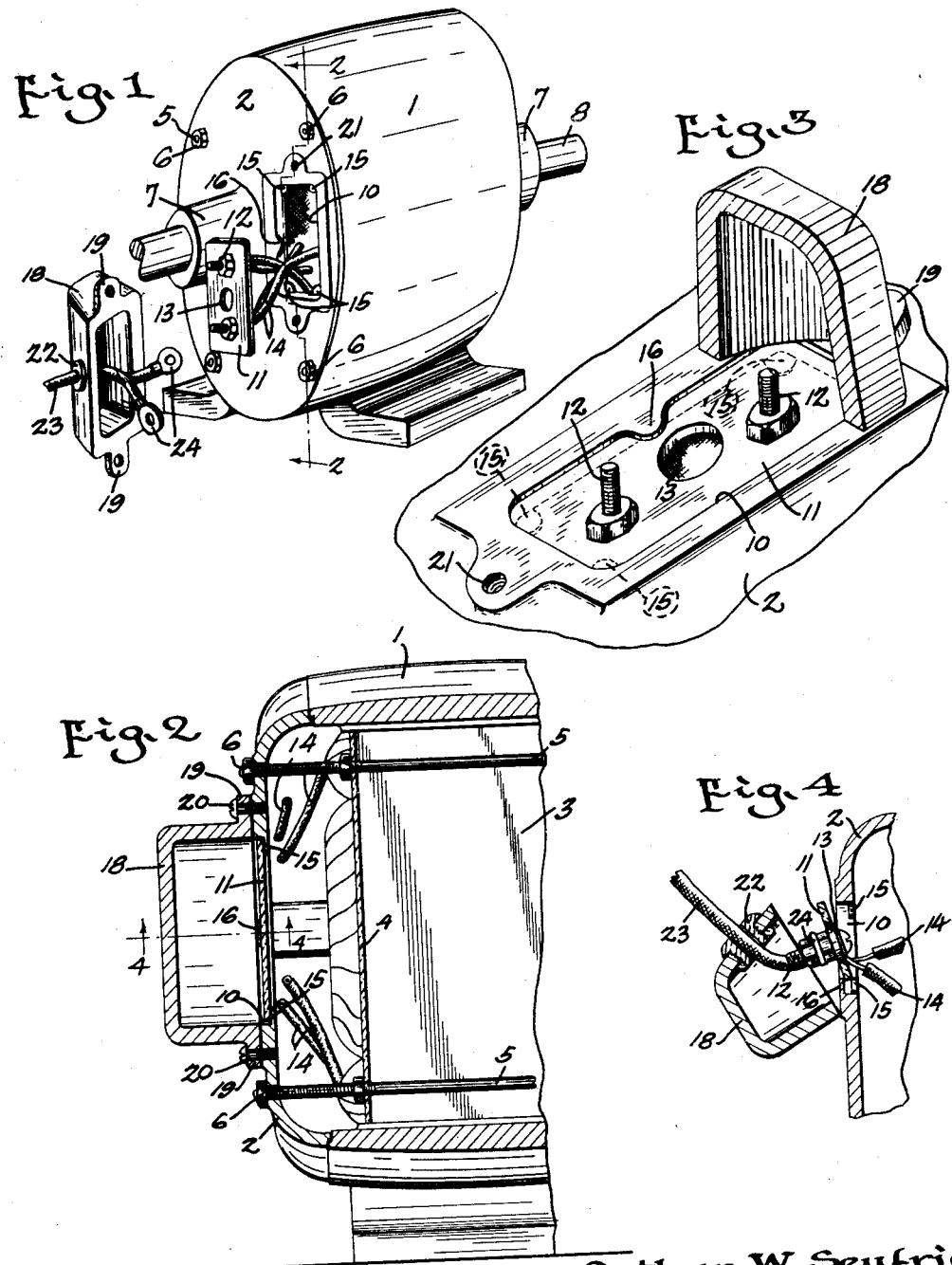
Arthur W. Seyfried
Inventor
by Smith and Freeman
Attorneys Patented Feb. 10, 1931

1,792,044

UNITED STATES PATENT OFFICE

ARTHUR W. SEYFRIED, OF CLEVELAND HEIGHTS, OHIO, ASSIGNOR TO THE APEX ELECTRICAL MANUFACTURING COMPANY, OF CLEVELAND, OHIO, A CORPORATION OF OHIO

TERMINAL BLOCK

Application filed June 19, 1929. Serial No. 372,182.

This invention relates to electrical apparatus and especially to dynamo electric machinery such as the small electric motors often used to drive light machinery, washing machines, ironing machines, refrigerating apparatus, computing machines, bookkeeping machines, electric fans, and other mechanical devices, or for generating current in small units, but is also applicable to other types of apparatus as will appear to those skilled in the art. Practically all these uses demand a mechanism of simplicity and cheapness in manufacture combined with a construction which shall be largely dust and water-proof, and it is of advantage during manufacture to fasten the terminals of the different windings or appliances permanently to the final supporting element despite the fact that some parts of the enclosing element or frame have still to be added, and it is also desirable even after the completion of the apparatus to have access to these terminals for various reasons. The objects of this invention are the provision of a terminal block which shall be supported in a new, simplified and more convenient manner than heretofore; the provision of a terminal block which can be secured to the windings or appliances prior to the completion of the machine frame or enclosure without impeding the bringing of those terminals outside of the same; the provision of a new type construction and mounting of terminal block; the provision of a motor or dynamo having improved features of simplicity, cheapness and tight enclosure; while further objects and advantages of the invention will become apparent as the description proceeds.

In the drawings accompanying and forming a part of this application I have shown certain simple, mechanical forms in which my inventive idea can be embodied, although it will be understood that these are merely illustrative of the general principles of my invention and are not exhaustive of its mode of application. Fig. 1 is a perspective view of a small motor containing my improvements, the terminal-housing having been removed and the terminal-block itself unseated; Fig. 2 is a vertical sectional view corresponding to the broken line 2—2 of Fig. 1; Fig. 3 is a perspective view drawn to enlarged scale showing my improved terminal-block in place in the seat provided therefor; and Fig. 4 is a detail view showing the mode of applying the terminal-block.

Such a small motor or dynamo as I have herein chosen for illustrative purpose has a frame comprising a body portion 1 and end flanges or bells 2, at least one of which is removably secured thereto. The field or stator member 3 consists of steel or sheet-iron punchings assembled together and pressed into the frame and covered by an insulating end-plate 4 and traversed by bolts 5—5, whose threaded ends project through the flanges or bells and there receive nuts 6 whereby the latter are secured in place. The bearings 7 for the armature shaft 8 are carried by these flanges or bells, and as a result, when the latter are in place the frame of the motor becomes complete. It is desirable for practical purposes, at least with small motors which are used for domestic purposes or for light machinery, that these frames be closed as completely as possible to prevent the entrance of moisture, dust, and vermin, although it is also necessary that provision be made at some point for the necessary electrical connections. For this purpose one of the bells or end flanges 2 which is removable is formed at one side of its bearing with an aperture 10 of sufficient size to receive flat-wise in its own plane a terminal-block 11 of insulating material preferably made of fibre or some equivalent, electrically-insulating material among which may be mentioned rubber, porcelain, bakelite, slate, soapstone, mica, and a great many synthetic waxes. This plate is provided with a suitable number of metallic binding posts 12, generally two, and sometimes also with a fingerhole 13 additional thereto. The terminals 14 of the different windings, and also oftentimes of the starting coils when such are used, (or other appliances in case same are present) are connected to this plate at the time the parts are introduced into the main frame and before the end-flange or bell is applied. The aperture 10 is generally made oblong in shape although this is a matter of convenience rather than of necessity and any desired shape can be employed. At its inner end this opening is provided with a plurality of spaced fingers or stops 15, preferably cast integral with the flange, and spaced sufficiently apart to enable the plate 11 to pass freely between them edge-wise and afterwards be seated exteriorly upon them flatwise as shown in Figs. 2 and 3. To assist in defining the position of this plate I have shown the aperture 10 as formed with a finger 16 at its outer edge beneath which the margin of this plate is introduced. If this finger be so located as to press tightly upon the insulating plate, the latter will be held quite firmly in place, although even if it be loose or omitted the device will be found very serviceable.

Over the top of this plate I secure a hollow removable cover 18 provided with ears 19 for the reception of bolts 20 adapted to fit holes 21 provided therefor adjacent to the aperture 10. One side of this cover is apertured for the bushing 22 of insulating material through which the flexible electric cord 23 passes, the latter being provided with terminals 24 removably secured to the outer ends of the binding posts 12. This cover is fitted tightly to the exterior of the flange or bell 2, and also preferably overlaps somewhat the corners or margins of the plate 11 as shown in Fig. 3 so as to hold the same tightly in position and prevent such displacement as might cause short circuiting at any point. By removing the cover 18 and drawing the plate 11 outward as shown in Fig. 1 the connections can be readily inspected, interchanged or repaired, and by displacing the plate and slipping it edgewise through the opening 10 the end flange can be removed and the parts dismounted without interfering with any of the internal connections. This mode of constructing and mounting the plate enables the motor to be constructed and assembled a few cents more cheaply than other devices of this character such as that shown in the Letters Patent of E. B. Hoff, issued April 1, 1924, No. 1,488,498 of which this is an improvement. However, I do not limit myself to the exact details of construction herein shown excepting as the same are specifically recited in my several claims which I desire may be construed broadly each independently of limitations contained in other claims.

Having thus described my invention what I claim is:

1. In dynamo electric machinery, the combination with a frame having a removable end-member provided with a shaft bearing and electro-magnetic coils inside said frame, said end-member having an aperture at one side of said bearing of a terminal block shaped and adapted when presented to said aperture in one position to pass freely through the same and when presented to said aperture in another position to become firmly seated therein, and contact devices carried by said terminal block, and accessible from the exterior when said end member is in place.

2. In electric apparatus, the combination with a wired element having terminals, of a terminal block, contact devices carried by said block and having said terminals connected thereto, said block being freely movable relative to said element within the limits defined by said terminals, a housing for said element having an aperture therein of a size to permit said terminal block to be passed therethrough, and means for securing said block detachably in said aperture with said contact devices accessible from the exterior.

3. In dynamo electric machinery, the combination with fixed and rotatable electromagnetic members, of a terminal block, contact devices carried by said terminal block and connected to the windings of certain of said electro-magnetic members, a housing, one part of said housing being removable and having therein a bearing for the rotatable member and an aperture at one side of said bearing adapted for the reception of said terminal block, and means for securing said terminal block to said removable part with said contact devices accessible from the exterior, said aperture and block being of a shape to permit said block to be passed edgeways therethrough and to be secured flatways therein.

4. In dynamo electric machinery, in combination a frame, an end member detachably secured to said frame and having a journal bearing and an aperture at one side of said bearing, a stationary electro-magnetic member inside said frame, a rotatable electromagnetic member journaled in said frame, a terminal block adapted to be passed through said aperture, means for securing said terminal block to said end-member, contact members carried by said block accessible from the exterior of said end-member, and connections between said contact members and the electro-magnetic windings, said connections being independent of said end-member.

5. In electrical apparatus, a hollow metal structure having an oblong aperture in its wall, a terminal block comprising an oblong plate of insulating material adapted to pass through said aperture edgeways and to fit in said aperture flatways, and means for fastening said plate detachably in said aperture.

In testimony whereof I hereunto affix my signature.

ARTHUR W. SEYFRIED.